(12) United States Patent
Okada

(10) Patent No.: US 6,982,754 B2
(45) Date of Patent: Jan. 3, 2006

(54) VIDEO CAMERA

(75) Inventor: Hideo Okada, Uda-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 861 days.

(21) Appl. No.: 09/808,320

(22) Filed: Mar. 14, 2001

(65) Prior Publication Data

US 2001/0022625 A1 Sep. 20, 2001

(30) Foreign Application Priority Data

Mar. 15, 2000 (JP) .............................. 2000-071701

(51) Int. Cl.
*H04N 5/76* (2006.01)
(52) U.S. Cl. .............................. 348/231.1; 348/231.7; 348/237.99; 348/372; 348/552; 396/6
(58) Field of Classification Search ............ 348/231.7, 348/231.1, 552, 372, 231.99; 396/6
See application file for complete search history.

(56) References Cited

U.S. PATENT DOCUMENTS 4,511,932 A * 4/1985 Ushiro ....................... 386/117
5,627,587 A * 5/1997 Murata et al. ........... 348/231.7
5,805,219 A * 9/1998 Ejima et al. ................ 348/375
6,134,205 A * 10/2000 Watanabe ................. 369/77.1
6,766,109 B2 * 7/2004 Negishi et al. ................ 396/6
2003/0011690 A1 * 1/2003 Uryu ....................... 348/231.7

FOREIGN PATENT DOCUMENTS

| JP | 6-311406 | 11/1994 |
| JP | 07-170475 | 7/1995 |
| JP | 09-107493 | 4/1997 |
| JP | 11-008786 | 1/1999 |

* cited by examiner

*Primary Examiner*—Thai Tran
*Assistant Examiner*—Chriss S. Yoder
(74) *Attorney, Agent, or Firm*—David G. Conlin; William J. Daley, Jr.; Edwards & Angell, LLP

(57) ABSTRACT

The video camera has an opening for removal of a cassette tape. The video camera includes a cassette detecting portion 2 detecting ejection of the cassette tape from the opening, and a cassette insertion preventing mechanism 5 preventing re-insertion of the cassette tape when the cassette detecting portion 2 detects ejection of the cassette tape. As such, a video camera for a recycling system can be provided where a recording medium or the like with a recorded content is easily and rapidly available to a user and a dedicated reproducing device is not required.

22 Claims, 9 Drawing Sheets

VIDEO CAMERA

BACKGROUND OF THE INVENTION

1. Field of the Invention

The present invention relates to video cameras and, more specifically to a video camera provided with a technique and system which are most suitable for a recycling system.

2. Description of the Background Art

Due to aggressive approaches to environmental problems in recent years, development of recyclable (reusable) products has become a major concern. Examples of recyclable products include a recording and reproducing device disclosed in Japanese Patent Laying-Open No. 6-311406. The recording and reproducing device is provided with a video camera dedicated to recording not having any reproducing function as well as a separately provided reproducing device dedicated to reproduction.

The above mentioned structure has led to cost reduction of video cameras, making them readily available to users. A recorded content is brought to a copying agent where a reproducing device is placed, and copied onto a recording medium such as a video tape, so that the recording medium with the recorded content is made available to a user. The video cameras returned to the copying agent are brought back to a manufacturer for reuse and recycling of parts, which are reused for new video cameras.

In the conventional system of utilizing a recording and reproducing device as described above, when a user of a video camera is to record and verify the recorded content or acquire a recording medium, he or she must bring a video camera to a copying agent, where the content is copied onto a prescribed recording medium by a dedicated reproducing device. Thus, the user must go through a troublesome process of acquiring the recording medium with the recording content. In addition, the copying agent must pay equipment cost or expenses for placing the dedicated reproducing device in service for copying.

SUMMARY OF THE INVENTION

The present invention is made to solve the aforementioned problems. An object of the present invention is to provide a video camera allowing a user to readily and quickly acquire a recording medium or the like with a recorded content, and eliminating the need for a dedicated reproducing device.

A video camera according to one aspect of the present invention is provided with: a recording medium for recording; a mechanical part for writing record information onto the recording medium; an optical system for taking an image of an object; a controlling portion for controlling recording of the image; a battery; an external input portion used by a user to input; and a cabinet for containing the recording medium; the mechanical part; the optical system; the controlling portion; the battery and the external input portion. There are further provided: a medium detecting portion detecting ejection of the recording medium from an opening formed in the cabinet for removal of the recording medium; and a medium insertion preventing unit inhibiting re-insertion of the recording medium when the ejection of the recording medium is detected by the medium detecting portion.

The above described mechanism prevents the recording medium from being re-inserted to the video camera after it is ejected, so that reuse of the video camera by the user is prevented and recycling of the video camera is promoted. In addition, the recording medium ejected from the video camera can be reproduced by the reproducing device that the user possesses, so that a higher level of convenience is provided for the user without involving any copying operation at a copying agent as in the conventional case. Further, since a manufacturer needs not develop a reproducing device for copying a recorded content from the user, development cost can be minimized.

The above described invention employs the following mechanism as a preferred embodiment. For example, the mechanism includes: a recording capacity detecting portion for determining a remaining capacity of the recording medium; and a current stop function for stopping current supply from the battery to at least one of the mechanical part, controlling portion and optical system when it is detected by the recording capacity detecting portion that the remaining capacity is zero. Such a mechanism notifies the user that the remaining capacity of the recording medium is low and promotes recycling of the video camera.

Preferably, there are further provided a display portion and a take-out instruction displaying portion for displaying an instruction onto the display portion to take out the recording medium when the recording capacity detecting portion determines that the remaining capacity of the recording medium is zero. Such a mechanism can visually notify the user that the remaining capacity of the recording medium is low and promotes recycling of the video camera to the user.

Preferably, there is further provided a return instruction displaying portion for displaying an instruction onto the display portion to return the video camera when the medium detecting portion detects that the recording medium has been ejected. Such a mechanism can visually promote recycling of the video camera to the user.

A video camera according to another aspect of the present invention is provided with: a recording medium for recording; a mechanical part for writing record information onto the recording medium; an optical system for taking an image of an object; a controlling portion for controlling recording of the image; a battery; an external input portion used by a user to input; and a cabinet for containing the recording medium; the mechanical part; the optical system; the controlling portion; the battery and the external input portion. There are further provided: an opening detecting portion detecting formation of an opening in the cabinet for removal of the recording medium; and a current stop function portion for stopping current supply from the battery to at least one of the mechanical part, controlling portion and optical system when the opening detecting portion detects the formation of the opening.

Such a mechanism prevents use of the video camera after the formation of the opening, so that reuse of the video camera by the user is prevented and recycling of the video camera is promoted. In addition, the recording medium which has been ejected from the video camera can be reproduced by the reproducing device that the user possesses, so that a higher level of convenience is achieved without involving any copying operation at a copying agent as in the conventional case. Further, since a manufacturer needs not develop any reproducing device for copying the recorded content provided by the user, development cost can be minimized.

The above described invention employs the following mechanism as a preferred embodiment. For example, the mechanism further includes: a display portion; a recording capacity detecting portion for determining a remaining capacity of the recording medium; and a take-out instruction displaying portion for displaying an instruction onto the display portion to take out the recording medium when the recording capacity detecting portion determines that the remaining capacity of the recording medium is zero. Such a mechanism can visually promote recycling of the video camera to the user.

Preferably, there is further provided a usage inhibit portion for displaying onto the display portion that the use of the video camera is inhibited to a user when the opening detecting portion detects the formation of the opening. Such a mechanism can visually promote recycling of the video camera to the user.

Preferably, the cabinet includes a body resin portion of a casing of the video camera, and a cover resin portion which is integrally molded with the body resin portion. The above mentioned opening is formed by opening a hole in the cover resin portion. Preferably, the cabinet is characterized in that a feature is provided at a boundary between the body resin portion and the cover resin portion. More preferably, the cabinet is characterized in that a linear groove is formed along the feature. Although the cabinet has a sufficient strength to prevent the groove from being destroyed by a usual external force, an external force exceeding a certain level would destroy the groove, so that an opening is formed for removal of the cassette in the cabinet.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The video camera of the embodiments of the present invention will now be described with reference to the drawings.

First Embodiment

Figure 1:
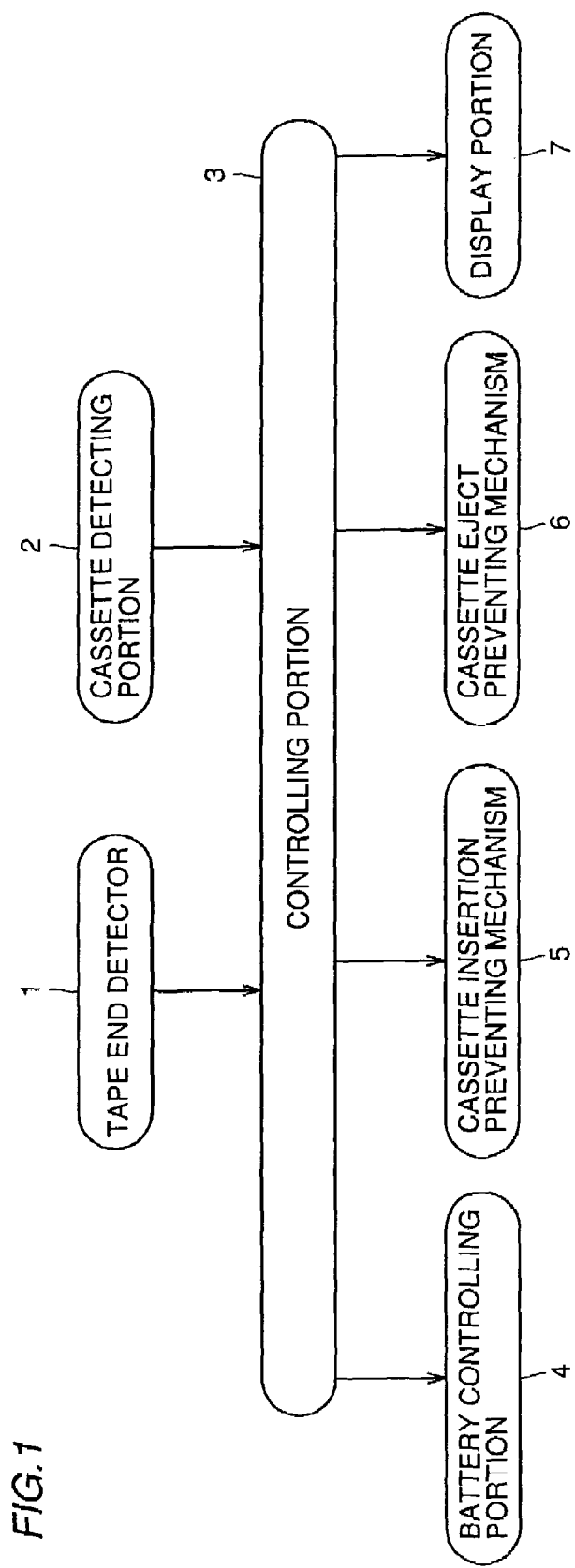
FIG. 1 is a block diagram shown in conjunction with control of a video camera of the first embodiment.
Figure 2A:
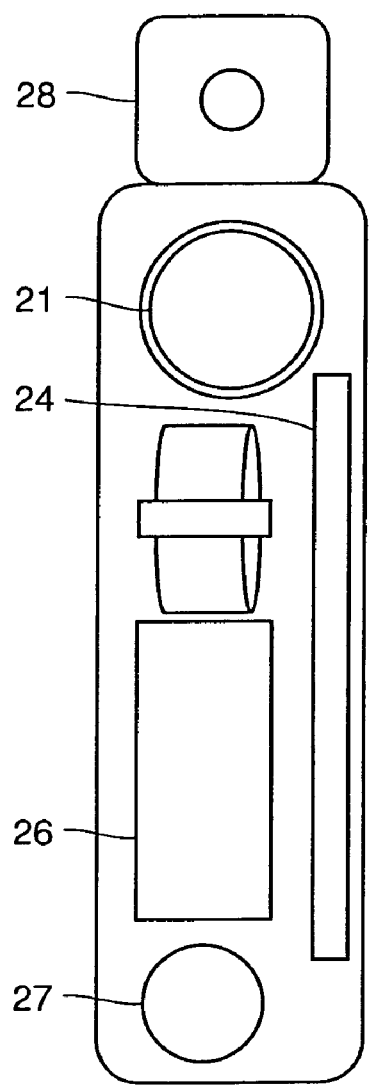
FIG. 2A is a front view showing an arrangement of parts of the video camera of the first embodiment.
Figure 2B:
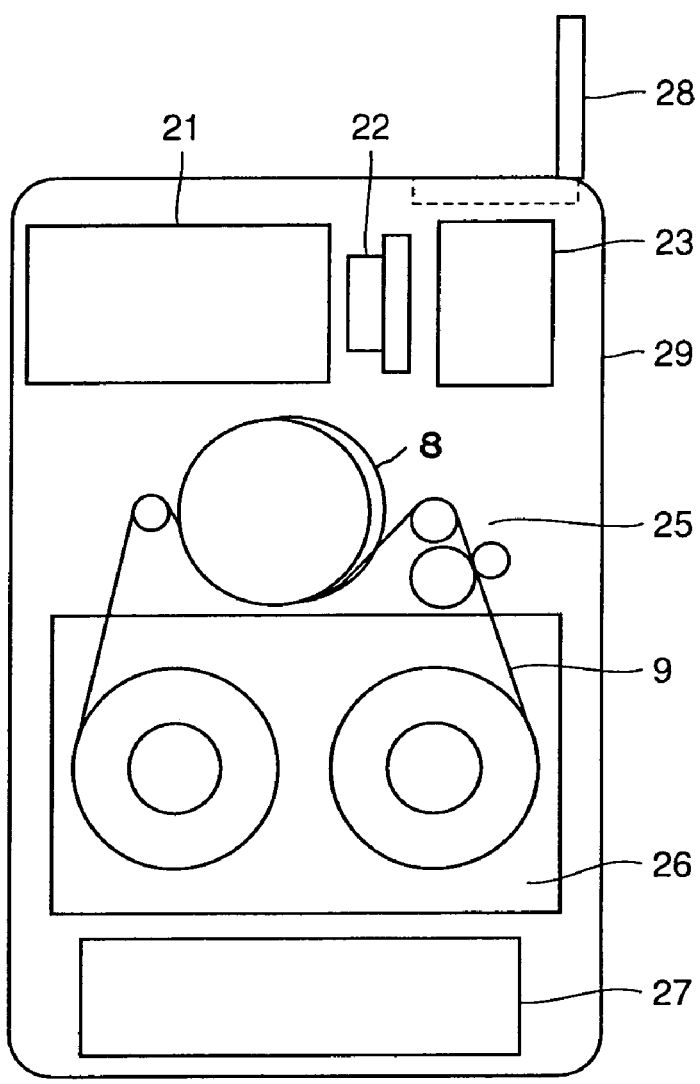
FIG. 2B is a side view showing the arrangement of parts of the video camera of the first embodiment.

FIG. 1 shows a control block of a video camera according to the first embodiment of the present invention. FIGS. 2A and 2B show arrangements of parts used for the video camera of the embodiment of the present invention. In FIG. 1, components not directly related to the present invention, e.g., a video camera body and a tape driving mechanism, are not shown for the sake of simplicity.

<Mechanism of Video Camera>

Referring to FIG. 1, the control block of the video camera of the present embodiment includes a tape end detector 1, a cassette detecting portion 2, a controlling portion 3, a battery controlling portion 4, a cassette insertion preventing mechanism 5, a cassette eject preventing mechanism 6, and a display portion 7.

Referring to FIG. 2, the video camera of the present embodiment is internally provided with a lens portion 21, a CCD 22, a video signal processing circuit 23, a main substrate 24, a mechanical body 25, a cassette 26, a battery 27, a finder 28, a cabinet 29 for the video camera body and so on.

Figure 3A:
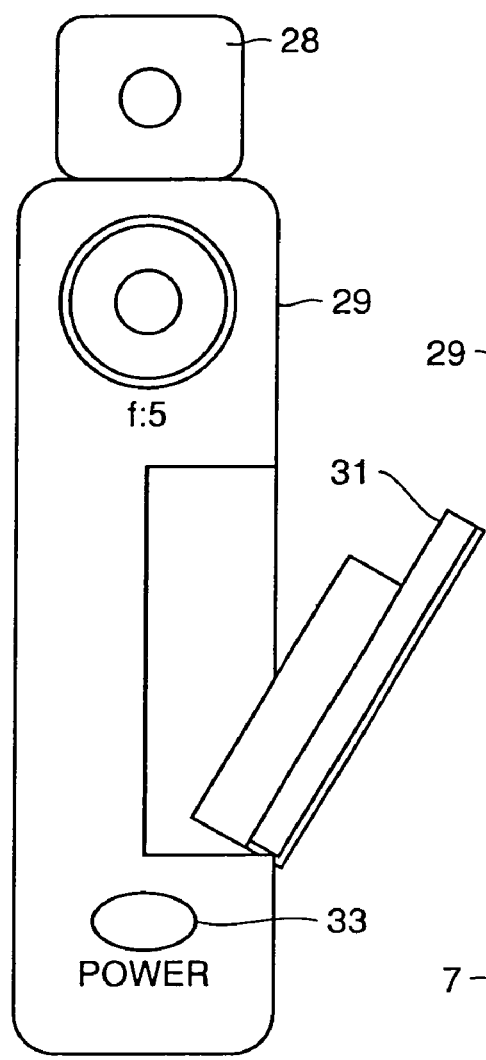
FIG. 3A is a front view of a video camera of the first embodiment.
Figure 3B:
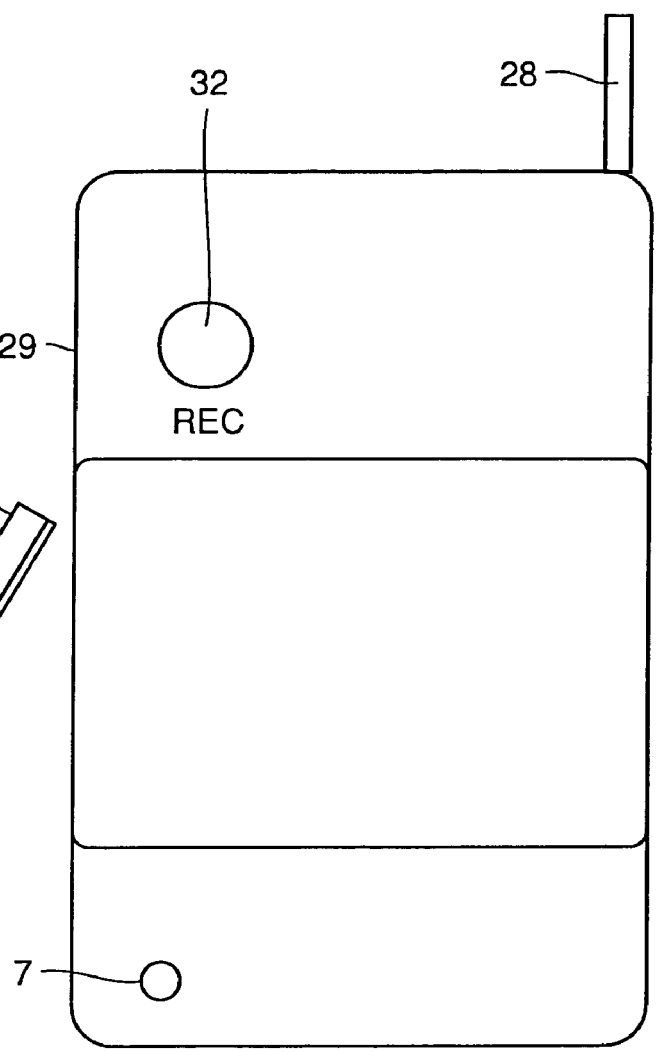
FIG. 3B is a side view of the video camera of the first embodiment.

Referring to FIGS. 3A and 3B, shown in the schematic diagram of the video camera of the present embodiment are a cassette ejecting cover 31, a record button 32 and a main switch 33. It is noted that, in FIG. 3, cassette ejecting cover 31 is shown as being opened to provide better understanding of its structure.

Returning to FIG. 1, tape end detector 1 detects a transparent portion at the end of a magnetic tape 9 enclosed in cassette 26 with use of a commercially available photo interrupter for detecting the remaining amount or the end of the magnetic tape. Cassette detecting portion 2 detects the presence of cassette.

Controlling portion 3 is in a circuit portion mounted on main substrate 24 for controlling the present invention as will later be described. Battery controlling portion 4 controls current supply to various components under instructions of controlling portion 3. Cassette eject preventing mechanism 6 releases a lever which locks the eject mechanism of cassette ejecting cover 31.

Cassette ejecting cover 31 is usually locked to prevent a user from opening it. When the user ejects the cassette, cassette insertion preventing mechanism 5 prevents re-insertion of the cassette. Display portion 7 appropriately displays instructions to the user, e.g., to eject cassette 26 and return the video camera.

Returning to FIG. 2, lens portion 21 causes a CCD 22 to image optical information of an object, and CCD 22 converts the obtained optical information to electrical information. Video signal processing circuit 23 amplifies an electrical signal from CCD 22 and converts it to a standardized video signal. Main substrate 24 has a circuit portion of, e.g., controlling portion 3 for performing a process of reproducing a video signal and controlling mechanical body 25.

Mechanical body 25 includes: a drum mounted with a magnetic head for recording record information onto magnetic tape 9, a loading mechanism for drawing magnetic tape 9 from cassette 26, a capstan and a pinch roller for driving magnetic tape 9 at a prescribed speed, and the like. These components are controlled by a circuit of main substrate 24.

Cassette 26 contains magnetic tape 9 and is preliminary set at a prescribed position in mechanical body 25 at the time of manufacture.

Referring to FIGS. 2A, 2B, 3A and 3B, finder 28, a part of cabinet 29, is lifted by the user as shown, through which an image of the object is received. Cassette ejecting cover 31 cannot be opened during normal use.

When the tape comes to the end and the user stops recording, the locking of the eject mechanism is released, so that the user can take out cassette 26. Once cassette 26 is ejected from the video camera, the ejection of cassette 26 is detected by cassette detecting portion 2 as will later be described and cassette insertion preventing mechanism 6 operates to prevent re-insertion of cassette 26 by the user. Record button 32 is used when the user wishes to start recording. Further, main switch 33 is used to bring the video camera into a stand-by mode for recording.

<Operation of Video Camera>

Video camera of the present embodiment having the above structure will be described. After main switch 33 of the body is turned on, a current is supplied from battery 27 to main substrate 24 and mechanical body 25. The video camera is brought into a stand-by mode for recording, and mechanical body 25 is loaded onto a position approximately as shown in FIG. 2. The user views the object through finder 28 and presses record button 32 to start recording.

When recording is started, a current is supplied from battery 27 to CCD 22 or video signal processing circuit 23. The video information on the object is transmitted sequentially to lens portion 21, CCD 22, video signal processing circuit 23, and main substrate 24. Then, the video information is recorded onto magnetic tape 9 in cassette 26 through a rotating drum 8 of mechanical body 25. In this recording state, cassette eject preventing mechanism 6, which will later be described, is in operation to prevent cassette cover 31 from being opened from outside. Note that a known technique can be applied to these prescribed signal processes or to the operation of mechanical body 25, and therefore detailed description thereof will not be given here.

When magnetic tape 9 comes close to the end as a result of the recording operation of the user, the end of magnetic tape 9 is detected by tape end detector 1. When the end of magnetic tape 9 is detected by tape end detector 1, the end of the tape is determined by controlling portion 3 of main substrate 24.

When mechanical body 25 moves to a position for unloading, where ejection of cassette 26 is possible, display portion 7 is used to display instructions to take out cassette 26 and return the video camera to the user. At the same time, cassette insertion preventing mechanism 5 is moved to prevent re-insertion of cassette 26. Thereafter, current supply to any circuits that do not need current anymore, such as CCD 26 and video signal processing circuit 23, is stopped by battery controlling portion 4.

<Detailed Structure of Mechanical Body 25>

Figure 4:
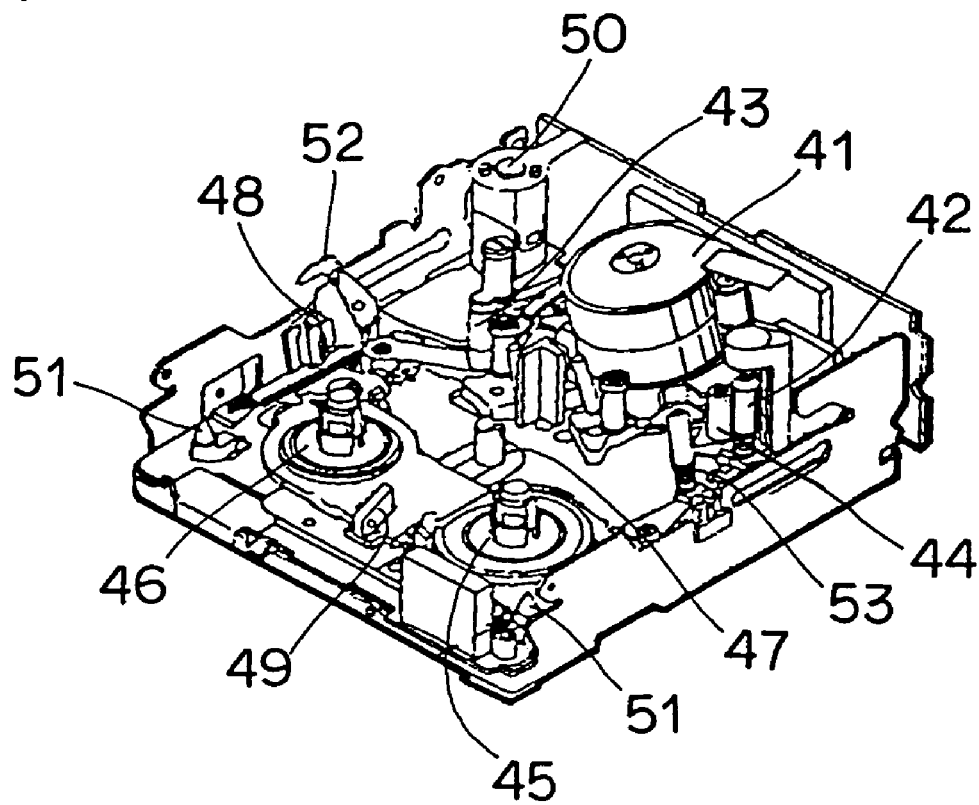
FIGS. 4 and 5 are respectively first and second diagrams showing in detail structures of a mechanical body portion 25 of the video camera of the first embodiment.
Figure 5:
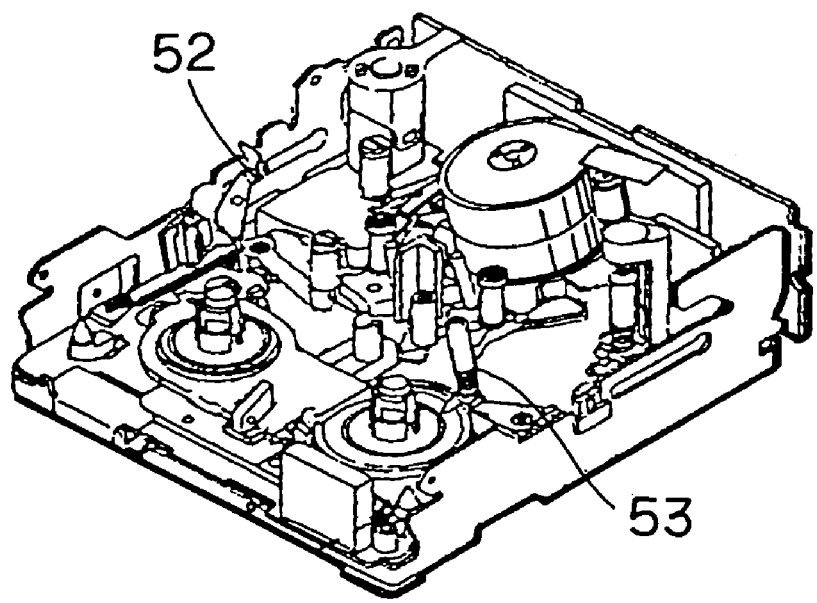

FIGS. 4 and 5 are diagrams showing in detail mechanical body 25. It is noted that both diagrams do not show cassette 26 and magnetic tape 9 for the sake of simplicity. FIG. 4 shows a structure of mechanical body 25 during recording, whereas FIG. 5 shows mechanical body 25 when cassette 26 is ejected after recording. Mechanical body 25 includes a drum 41, a capstan 42, magnetic tape loading pins 43, 44, a take-up roller 45, a supply roller 46, a tape detecting LED 47, a tape end detector 48, a cassette reel unlocking lever 49, a drive motor 50, a cassette support 51, a cassette eject locking lever 52, and a tape insertion preventing lever 53.

<Recording Operation of Mechanical Body 25>

The recording operation of mechanical body 25 having the above described structure will now be described with reference to FIG. 4. Assume that cassette 26 is used in the same manner as a DVC (Digital Video Cassette). The DVC (not shown) is placed on cassette support 51. Cassette reel unlocking lever 49 releases the cassette reel locking mechanism in cassette 26, so that the reel of cassette 26 is unlocked.

The magnetic tape in cassette 26 is guided by magnetic tape loading pins 43, 44, being wound on drum 41 at a prescribed angle. Further, in recording, the magnetic tape is fed onto take-up reel 45 at a prescribed speed by capstan 42. The winding of the magnetic tape is performed by take-up reel 49. It is noted that supply reel 46 gives a back tension to the magnetic tape, but does not cause any drive force to the supply side. The above described operation is performed by the drive force of drive motor 50.

Tape detecting LED 47 is inserted into a hole for inserting the tape detecting LED of the cassette, although not shown. When a transparent end portion of the magnetic tape passes, a light source from tape detecting LED 47 is detected by tape end detector 48 which is positioned opposite to tape detecting LED 47, so that the remaining amount or the end of the magnetic tape is detected. Tape insertion preventing lever 53 is arranged as shown in FIG. 4, and does not affect the cassette or magnetic tape.

<Operation of Mechanical Body 25 After Recording>

Now, the operation of mechanical body 25 after recording will be described with reference to FIG. 5. FIG. 5 shows the mechanical body from which the cassette has been ejected by the user after recording. When the remaining amount or the end of magnetic tape is detected by tape end detector 1, cassette eject locking lever 52 is driven into position shown in FIG. 5 under instructions from controlling portion 3, whereby cassette cover 31 is unlocked and the user can open cassette cover 31.

When the cassette is ejected by the user, the ejection of the cassette is detected by a cassette detecting operation which will later be described. Then, tape insertion preventing lever 53 is driven into the position as shown in FIG. 5. Tape insertion preventing lever 53 is in contact with the surface of the cassette at the time of cassette insertion. After the cassette is ejected, it moves to a position where insertion of the cassette is prevented.

<Detection of Cassette Ejection>

Figure 6:
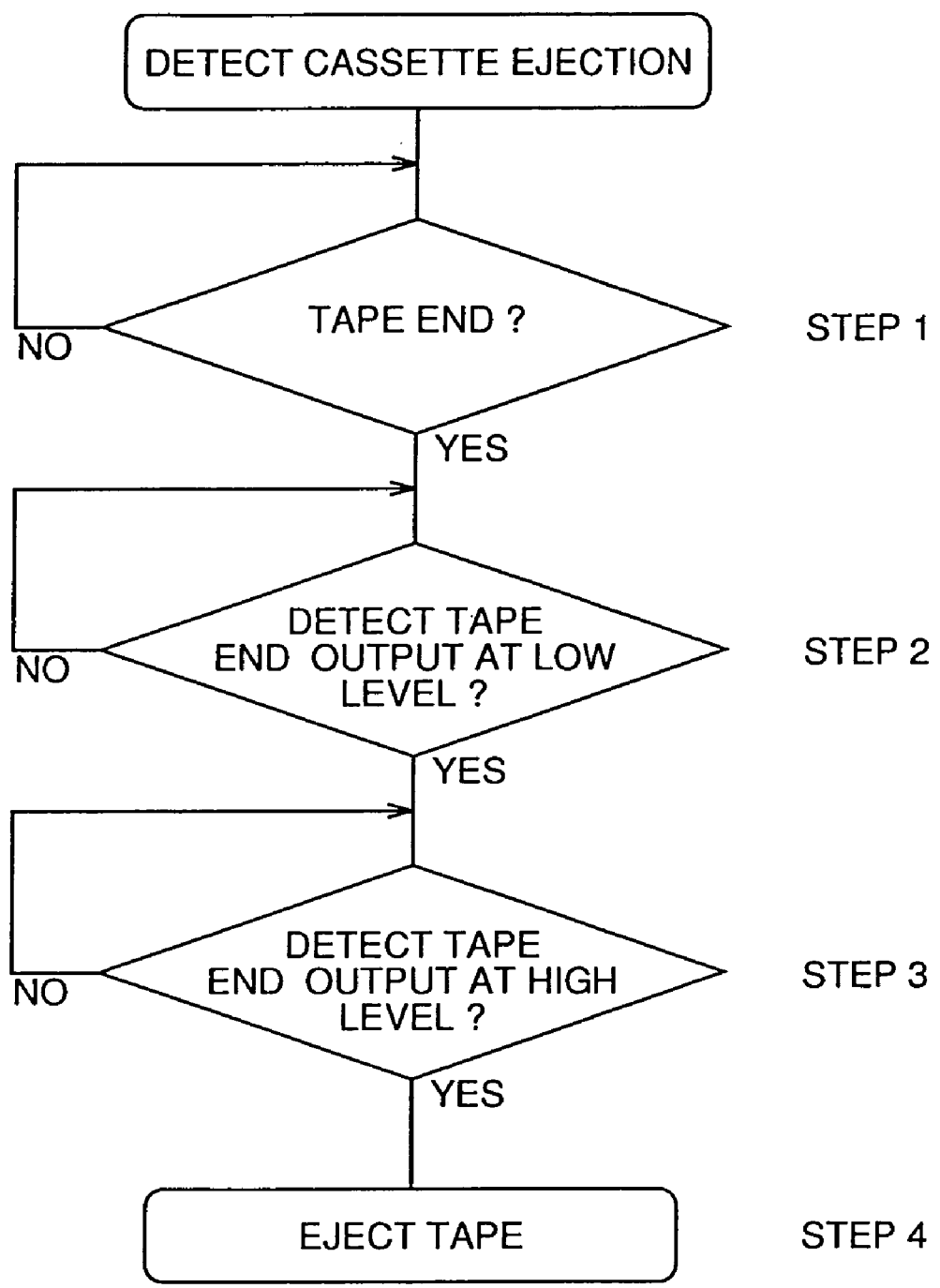
FIG. 6 is a flow chart showing a process of detecting ejection of a cassette of the video camera of the first embodiment.

The detection of cassette ejection is performed in the following manner. FIG. 6 shows a flow of detecting cassette ejection. It is noted that, in the present embodiment, an output from tape end detector 48 is used for detecting cassette ejection.

In a step 1, a determination is made as to if an output from tape end detector 48 is at a High level, and the transparent portion, i.e., end of the magnetic tape, is recognized (note that the High level of the output from tape end detector 48 refers to a tape end, i.e., the state in which nothing exists between tape detecting LED 47 and tape end detector 48 that shields the light source. Similarly, a Low level of the output from tape end detector 48 refers to a state in which the tape has not yet come to the end, i.e., something exists between tape detecting LED 47 and tape end detector 48 that shields the light source).

In a step 2, once the cassette is ejected by the user, the cassette temporarily shields the light source of tape detecting LED 47. Thus, the Low level of the output from tape end detector 48 is detected.

In a step 3, after the output from tape end detector 48 attains to the Low level, it is detected that the output from tape end detector 48 is to be again at the High level since the cassette has been ejected.

In a step 4, since the conditions of the steps 1 to 3 are met, the tape is ejected. It is noted that the presence of the cassette can be determined by provision of a leaf switch under the cassette, which is turned on/off as in a usual manner.

<Recycling System>

Figure 7:
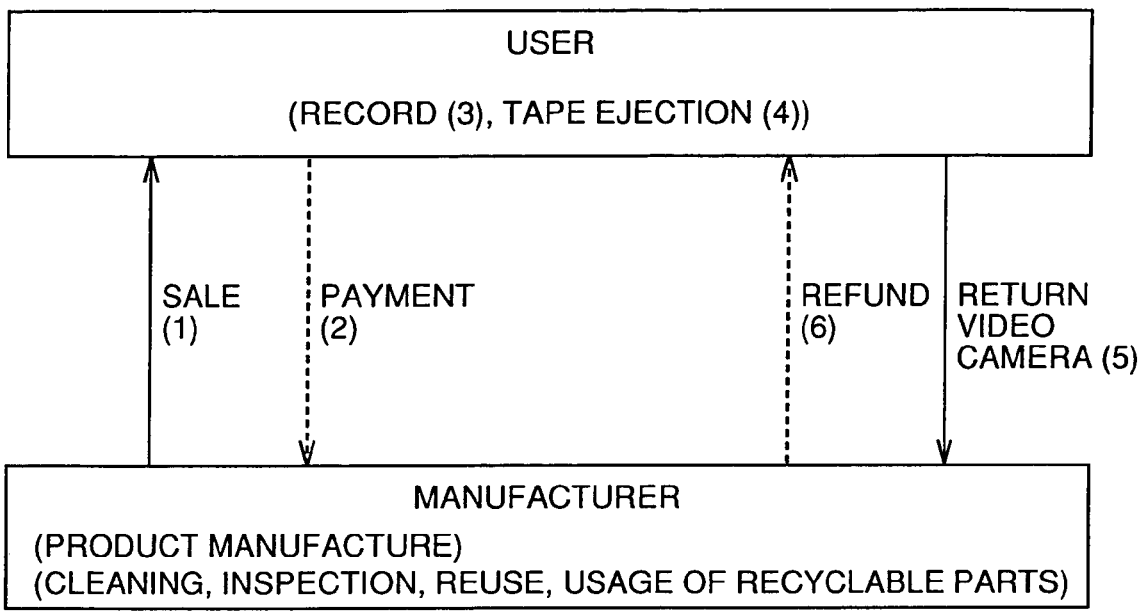
FIG. 7 is a block diagram showing a recycling system of the video camera of the first embodiment.

Now, a recycling system for a video camera of the present embodiment will be described with reference to FIG. 7. In FIG. 7, flows of products and money are respectively indicated by solid and dotted lines. The user purchases the video camera of the present embodiment through a manufacturer, a retail store or the like (1) and pays for it (2). After the user uses the video camera (after recording) (3), the cassette can be ejected by a cassette ejecting portion (4). The ejected cassette can be reproduced by a video cassette recorder that the user possesses.

When the cassette is ejected as described above, reinsertion of the cassette is prevented by cassette insertion preventing mechanism 5. Subsequently, the user returns the video camera through a store or the like (5), and a given amount of refund is paid by the manufacturer (6). The manufacturer inspects and cleans the returned video camera and then fills a cassette, charges the battery and so on for resale of the video camera as a product.

Second Embodiment

Figure 8:
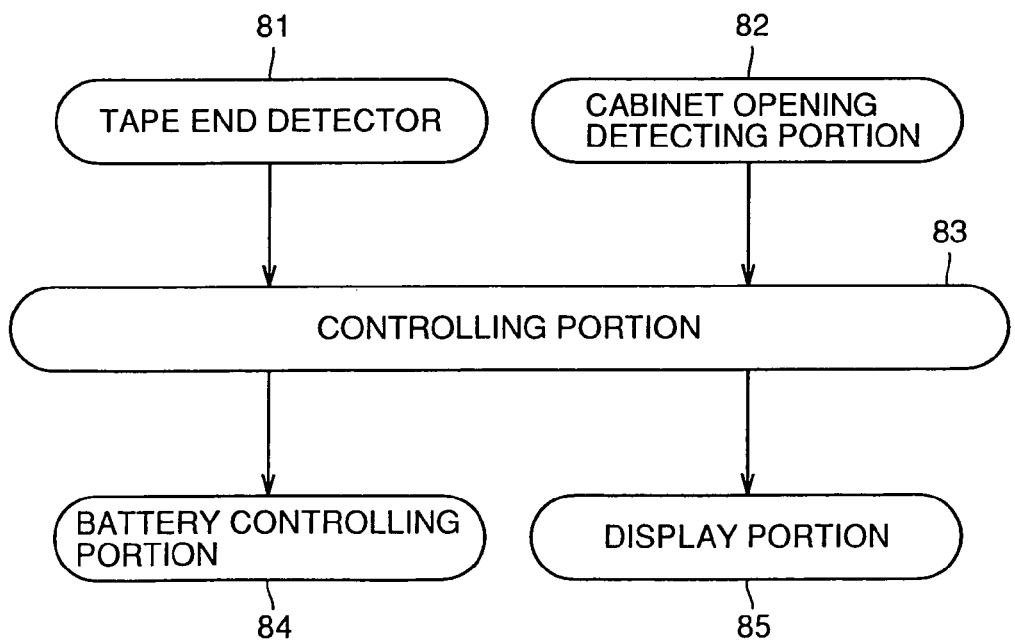
FIG. 8 is a block diagram shown in conjunction with control of a video camera of the second embodiment.
Figure 9A:
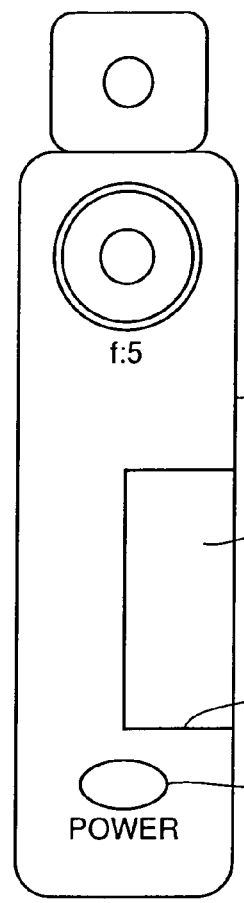
FIG. 9A is a front view showing a video camera of the second embodiment.
Figure 9B:
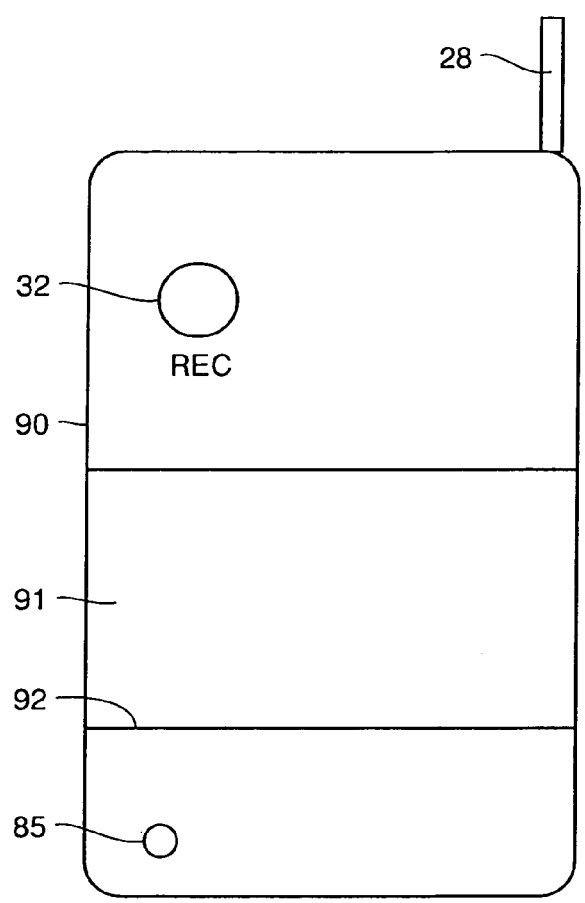
FIG. 9B is a side view showing the video camera of the second embodiment.

FIG. 8 shows a control block diagram of a video camera according to the second embodiment. FIGS. 9A and 9B are schematic views of the video camera. FIG. 3 shows a schematic diagram of the video camera of the present embodiment. Parts used for the video camera of the present embodiment are the same as in the first embodiment that are shown in FIG. 2, and therefore description thereof will not be repeated.

<Mechanism of Video Camera>

Referring to FIG. 8, a control block of the video camera of the present embodiment includes a tape end detector 81, a cabinet opening detecting portion 82, a controlling portion 83, a battery controlling portion 84, and a display portion 85.

Referring to FIGS. 9A and 9B, the video camera of the present embodiment includes a cabinet 90 of for example a resin material. A cover resin portion 91 is integrally formed with cabinet 90 near the cassette ejecting portion. Grooves 92 are formed that are used for removing cover resin portion 91 to provide an opening for cassette ejection.

Figure 10:
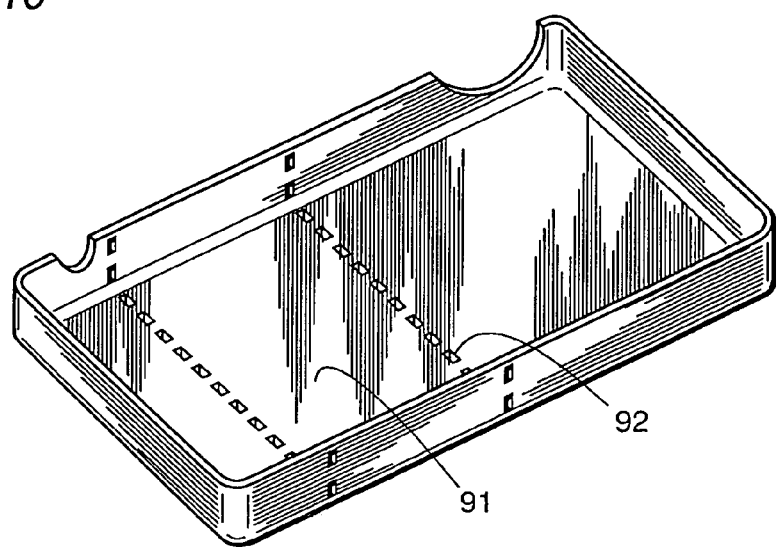
FIG. 10 is a perspective view showing a cabinet of the video camera of the second embodiment.

FIG. 10 shows a structure of the grooves in detail. Although cabinet 90 has a sufficient strength that prevents groove 92 from being destroyed by a usual force from outside, if a force exceeding a prescribed level is applied, grooves 92 are destroyed to enable removal of the cassette in cabinet 90.

<Detailed Structure of Mechanical Body>

Figure 11:
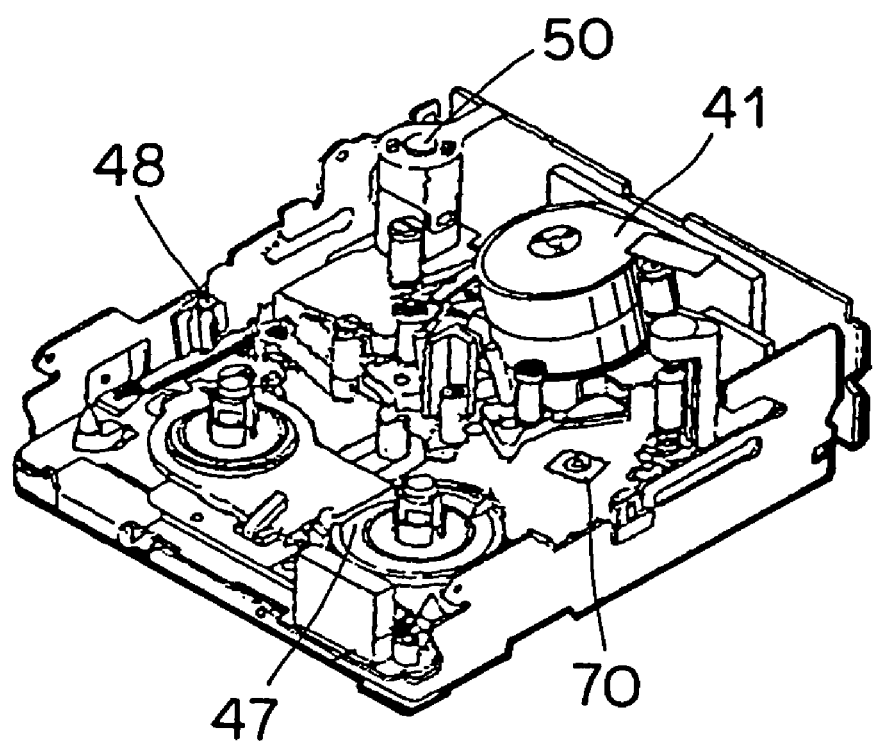
FIG. 11 is a diagram showing in detail a structure of a mechanical body portion of the video camera of the second embodiment.

FIG. 11 shows in detail a structure of the mechanical body of the video camera in accordance with the present embodiment. It is noted that the cassette and magnetic tape are not shown in the drawing for the sake of simplicity. Referring to FIG. 11, mechanical body includes a drum 41, a capstan 42, magnetic tape loading pins 43, 44, a take-up roller 45, a supply roller 46, a tape detecting LED 47, a tape end detector 48, a cassette reel unlocking lever 49, a drive motor 50, a cassette support 51, and a cabinet opening detecting portion 70.

Opening detecting portion 70 is formed of a CdS sensor that detects an opening by detecting a change in outside light when cover resin portion 91 of cabinet 90 is removed and the opening is formed. Note that, the detection can be made by a leaf switch or photo interrupter which is widely used for detection of an opening.

<Operation of Video Camera>

The operation of the video camera having the above structure will be described. After main switch 93 of the body is turned on, a current is supplied from battery 27 to main substrate 24 and mechanical body 25. Thus, the video camera is brought into a stand-by mode for recording. Mechanical body 25 is loaded onto a position approximately as shown in FIG. 2 and brought into the stand-by mode for recording. The user views an object through a finder 28 and presses record button 32 as necessary for starting a recording operation.

When the recording is started, the current from battery 27 is supplied to CCD 22 and video signal processing circuit 23. Video information on the object is sequentially transmitted to lens portion 21, CCD 22, video signal processing circuit 23, and main substrate 24. Then, the video information is recorded on magnetic tape 9 in cassette 26 through rotating drum 8 of mechanical body 25. It is noted that a prescribed signal processing or operation of the mechanical body is known in the art, and therefore detailed description thereof will not be given here.

During recording, cover resin portion 91 cannot be opened from outside. When magnetic tape 9 comes close to the end as a result of the recording operation of the user, the remaining amount or the end of the magnetic tape is detected by tape end detector 81. When the end of the magnetic tape is detected by tape end detector 81 and the end is determined by controlling portion 83 mounted on main substrate 24, mechanical body 25 is driven into a position for unloading where cassette 25 can be ejected, and displays an instruction onto display portion 7 to the user to return the video camera.

Then, current supply to circuit portions such as CCD 22 and video signal processing circuit 23 is stopped by battery controlling portion 4. During recording, the user cannot eject the cassette since cover resin portion 91 of cabinet 90 is closed as shown in FIG. 9. If the user removes cover resin portion 91 of cabinet 90 with a strong hand to provide an opening, the opening of cabinet 90 is detected by opening detecting portion 70. As a result, current supply from the battery to at least one of the mechanical portion, controlling portion and optical system is stopped by a current stop function portion, whereby the recording is stopped.

<Recycling System>

Figure 12:
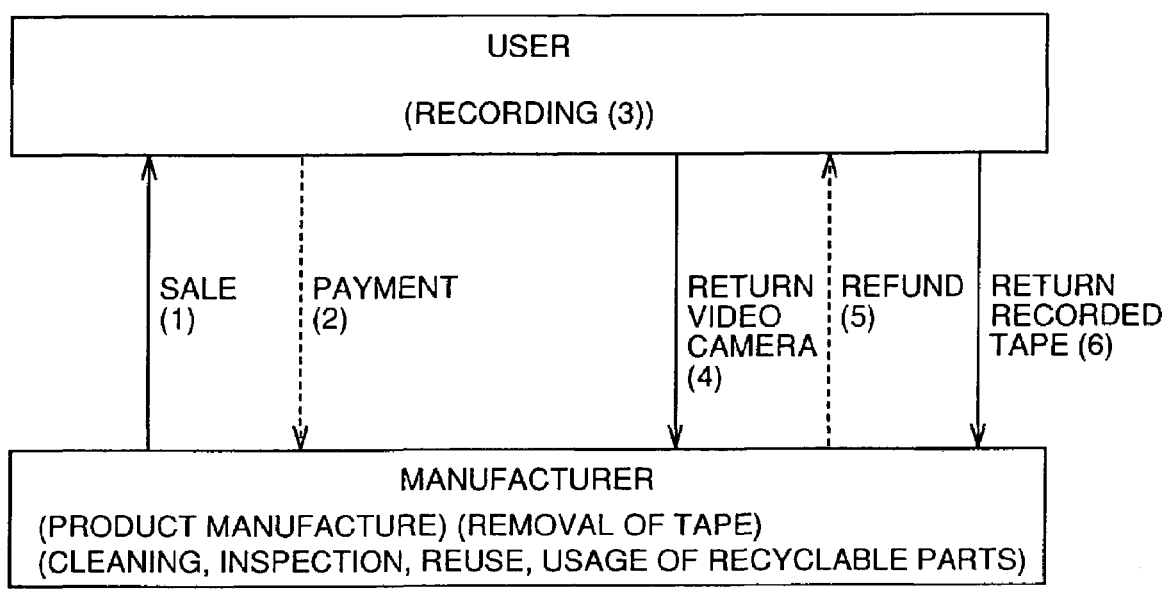
FIG. 12 is a block diagram showing a recycling system of the video camera of the second embodiment.

Now, with reference to FIG. 12, a recycling system for a video camera of the present embodiment will be described. It is noted that flows of products and money are respectively indicated by solid and dotted lines. The user purchases the video camera through a manufacturer or a retail store (1), and pays for it (2). After using the video camera for recording (3), the user returns the video camera to the manufacturer (or retail store) (4). The manufacturer (or retail store) opens opening 92 in cassette 90 along grooves 92 for cassette ejection, and returns the user the recorded cassette and pays a refund for the video camera (5), (6). The cassette returned to the user can now be reproduced with a video cassette recorder that the user possesses. The manufacturer inspects and cleans the returned video camera and then fills the cassette and charges the battery for resale of the video camera as a product.

In the video camera of the present embodiment, a recording medium cannot be re-inserted to the video camera after ejection, whereby reuse of the video camera by the user is prevented and recycling of the video camera is promoted.

In addition, since the recording medium which has been ejected from the video camera can be reproduced by a reproducing device that the user possesses, a higher level of convenience is achieved without involving any copying operation at a copying agent as in the conventional case. Further, since the manufacturer needs not develop a reproducing device for copying the recorded content provided by the user, development cost can be minimized.

In one embodiment of the video camera of the present invention, after user of the video camera, the cassette can be ejected by the user for reproduction by a video cassette recorder that the user possesses in a recycling system of the video camera. Therefore, a higher level of convenience is achieved without involving any copying operation or the like for reproduction as in the conventional case. In addition, since the manufacturer needs not develop a reproducing device for copying the recorded content provided by the user, development cost can be minimized.

In another embodiment of the video camera of the present invention, after user of the video camera, the user returns the video camera to the manufacturer, which in turn ejects the cassette from the video camera and returns the cassette to the user in the recycling system of video cameras. Thus, a higher level of convenience is achieved without involving any copying operation or the like for reproduction as in the conventional case. In addition, since the manufacturer needs not develop a reproducing device for copying the recorded content, development cost can be minimized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video camera provided with a recording medium for recording, a mechanical portion for writing record information onto said recording medium, an optical system for taking an image of an object, a controlling portion for controlling recording of the image, a battery, an external input portion for input operation by a user, and a cabinet containing said recording medium, said mechanical portion, said optical system, said controlling portion, said battery and said external input portion, comprising:

a medium detecting portion detecting ejection of said recording medium from an opening formed in said cabinet for removal of said recording medium; and a medium insertion preventing mechanism preventing re-insertion of said recording medium when said medium detecting portion detects ejection of said recording medium.

2. The video camera according to claim 1, further comprising:

a recording capacity detecting portion detecting a remaining capacity of said recording medium, and a current stop function portion for stopping current supply from said battery to at least one of said mechanical portion, controlling portion and optical system when said recording capacity detecting portion determines that the remaining capacity is zero.

3. The video camera according to claim 2, further comprising a display portion, and take-up instruction displaying means for displaying an instruction to take out said recording medium onto said display portion when said recording capacity detecting portion determines that the remaining capacity of said recording medium is zero.

4. The video camera according to claim 3, further comprising return instruction displaying means for displaying an instruction to return said video camera onto said display portion when said medium detecting portion determines that the recording medium has been ejected.

5. The video camera of claim 4, wherein:

the video camera is configured and arranged so as to be reusable and reconditioned by an authorized one following the return of the video camera; and said medium insertion prevention mechanism is configured so as to be reset during said reconditioning so as to allow insertion of another recording medium so said another recording medium can be recorded to during subsequent use of the video camera.

6. The video camera of claim 1, wherein the recording medium is a non-solid state recording medium.

7. The video camera of claim 6, wherein the non-solid state recording medium is a magnetic tape.

8. The video camera of claim 1, wherein said medium insertion prevention mechanism is configured so as to be reset by an authorized one following actuation of the medium insertion prevention mechanism so as to allow insertion of another recording medium.

9. The video camera of claim 8, wherein said medium insertion prevention mechanism is configured so as to be reset during said reconditioning so as to allow insertion of another recording medium so that said another recording medium can be recorded to during subsequent use of the video camera.

10. The video camera of claim 1, wherein the video camera is configured and arranged so as to be reusable and reconditioned following a use by authorized one.

11. The video camera of claim 10, wherein said medium insertion prevention mechanism is configured so as to be reset during said reconditioning so as to allow insertion of another recording medium so said another recording medium can be recorded to during subsequent use of the video camera.

12. A video camera provided with a non-solid state recording medium for recording, a mechanical portion for writing record information onto said recording medium, an optical system for taking an image of an object, a controlling portion for controlling recording of the image, a battery, an external input portion for input operation by a user, and a cabinet for containing said recording medium, said mechanical portion, said optical system, said controlling portion, said battery and said external input portion, said video camera further comprising:

an opening detecting portion for detecting formation of an opening in said cabinet for removal of said recording medium; and a current stop function portion for stopping current supply from said battery to at least one of said mechanical portion, controlling portion and optical system when said opening detecting portion detects formation of said opening; and wherein the current stop function portion is configured so as to maintain stoppage of current flow even in case where the user inserts another non-solid state recording medium into the video camera.

13. The video camera according to claim 12, further comprising:
- a display portion;
- a recording capacity detecting portion for determining a remaining capacity of said recording medium; and
- a take-up instruction displaying portion for displaying an instruction to take out said recording medium onto said display portion when said recording capacity detecting portion determines that the remaining capacity of said recording medium is zero.

14. The video camera according to claim 13, further comprising usage inhibit displaying means for displaying to a user onto said display portion an indication that usage of said video camera is inhibited when said opening is detected by said opening detecting portion.

15. The video camera according to claim 12, wherein said cabinet includes a body resin portion of a casing of said video camera, and a cover resin portion integrally formed with said body resin portion, and said cover resin portion is opened to form said opening.

16. The video camera according to claim 15, characterized in that a feature is formed at a boundary of said body resin portion and said cover resin portion, said boundary being configured so said cover resin portion is detached from said resin body portion along the boundary.

17. The video camera according to claim 16, characterized in that a linear groove is formed along said feature.

18. The video camera of claim 12, wherein the non-solid state recording medium is a magnetic tape.

19. The video camera of claim 12, wherein said current stop function portion is configured so as to stop current flow to prevent subsequent usage of the camera by any user.

20. The video camera of claim 12, wherein the video camera is configured and arranged so as to be reusable and reconditioned by an authorized one following a use of the video camera.

21. The video camera of claim 12 wherein:
- said cabinet includes a body resin portion of a casing of said video camera, and a cover resin portion integrally formed with said body resin portion;
- said cover resin portion and said body resin portion are configured and arranged so that said cover resin portion is detachable from the said body resin portion; and
- the detachment of the cover resin portion from the body resin portion forms the opening in said cabinet being detected by said opening detecting portion.

22. A video camera provided with a non-solid state recording medium for recording, a mechanical portion for writing record information onto said recording medium, an optical system for taking an image of an object, a controlling portion for controlling recording of the image, a battery, an external input portion for input operation by a user, and a cabinet for containing said recording medium, said mechanical portion, said optical system, said controlling portion, said battery and said external input portion, said video camera further comprising:
- an opening detecting portion for detecting formation of an opening in said cabinet for removal of said recording medium;
- a current stop function portion for stopping current supply from said battery to at least one of said mechanical portion, controlling portion and optical system when said opening detecting portion detects formation of said opening; and
- wherein said opening detecting portion and current stop function portion are arranged so operation of the video camera is controlled so camera usage is limited to one recording medium.

* * * * *